(12) United States Patent
Matsuda

(10) Patent No.: US 11,474,250 B2
(45) Date of Patent: Oct. 18, 2022

(54) DISTANCE IMAGE MEASURING DEVICE

(71) Applicant: DENSO WAVE INCORPORATED, Aichi-pref. (JP)

(72) Inventor: Naotake Matsuda, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 457 days.

(21) Appl. No.: 16/752,743

(22) Filed: Jan. 27, 2020

(65) Prior Publication Data

US 2020/0249358 A1 Aug. 6, 2020

(30) Foreign Application Priority Data

Feb. 1, 2019 (JP) .............................. JP2019-017229

(51) Int. Cl.
*G01S 17/89* (2020.01)
*G01S 17/10* (2020.01)
*G01S 7/497* (2006.01)
*G01S 7/481* (2006.01)

(52) U.S. Cl.
CPC ............ *G01S 17/89* (2013.01); *G01S 7/4813* (2013.01); *G01S 7/497* (2013.01); *G01S 17/10* (2013.01); *G01S 2007/4975* (2013.01)

(58) Field of Classification Search
CPC ........ G01S 17/89; G01S 7/4813; G01S 7/497; G01S 17/10; G01S 2007/4975
See application file for complete search history.

(56) References Cited

U.S. PATENT DOCUMENTS

| 10,054,675 | B2* | 8/2018 | Barnes | G01S 7/4865 |
| 10,687,034 | B1* | 6/2020 | Berkovich | H04N 9/083 |
| 2001/0024270 | A1* | 9/2001 | Shirai | 356/3.04 |
| 2008/0094643 | A1* | 4/2008 | Nishio | 356/623 |
| 2015/0312554 | A1* | 10/2015 | Banks | H04N 13/0253 |
| 2016/0320486 | A1* | 11/2016 | Murai | G01S 17/08 |
| 2017/0127047 | A1* | 5/2017 | Jeon | H04N 13/0271 |
| 2017/0227643 | A1* | 8/2017 | Nagai | G01S 17/36 |
| 2019/0056482 | A1* | 2/2019 | Nagai | G01S 7/497 |
| 2019/0086520 | A1* | 3/2019 | Boutaud | G01S 7/4865 |
| 2020/0271783 | A1* | 8/2020 | Koyama | G01S 17/08 |

FOREIGN PATENT DOCUMENTS

JP 2010-203820 9/2010

\* cited by examiner

*Primary Examiner* — Elaine Gort
*Assistant Examiner* — Anthony M Gartrelle
(74) *Attorney, Agent, or Firm* — Harness, Dickey & Pierce, P.L.C.

(57) ABSTRACT

A distance image measuring device includes: a light source; an image sensor receiving a reflected light generated by reflection of a projected light from an object; a housing accommodating the light source and the image sensor; a window provided in the housing and through which the projected light and the reflected light pass; a distance calculation section calculating a distance to the object; a reflection state switching member disposed on an optical path of the projected light; and an abnormality determination section determining whether there is an abnormality in a function of detecting the object.

7 Claims, 4 Drawing Sheets

DISTANCE IMAGE MEASURING DEVICE

CROSS REFERENCE TO RELATED APPLICATION

The present application claims the benefit of priority from Japanese Patent Application No. 2019-17229 filed on Feb. 1, 2019. The entire disclosures of all of the above applications are incorporated herein by reference.

TECHNICAL FIELD

The present disclosure relates to a distance image measuring device, and more particularly; to a distance image measuring device for measuring a distance by projecting and receiving light.

BACKGROUND

A distance image measuring device has been known which measures a distance to an object based on a flight time, which is a time from when a light source projects a projected light to when a reflected light generated by reflection of the projected light from the object is received by an image sensor.

SUMMARY

The present disclosure describes a distance image measuring device comprises: a light source; an image sensor that is configured to receive a reflected light generated; a housing that accommodates the light source and the image sensor; a window that is provided in the housing and through which the projected light and the reflected light pass; a distance calculation section that is configured to calculate a distance to the object; a reflection state switching member that is configured to switch between a reflection state in which the projected light is reflected in a direction toward the image sensor and a transmission state in which the projected light is transmitted, and is fixed to an inside of the device; and an abnormality determination section that is configured to determine whether there is an abnormality.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
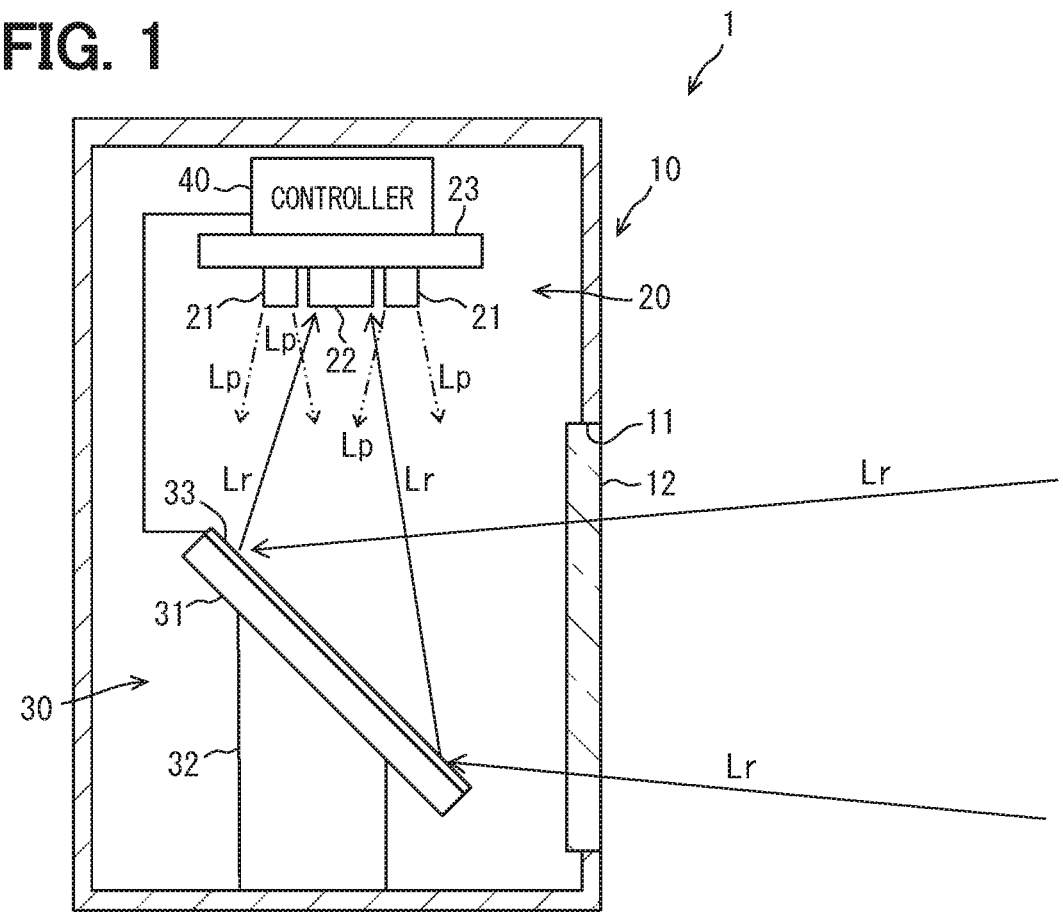
FIG. 1 is a diagram showing a configuration of a distance image measuring device according to a first embodiment.

A distance image measuring device has been known which measures a distance to an object based on a flight time, which is a time from when a light source projects a projected light to when a reflected light generated by reflection of the projected light from the object is received by an image sensor. The distance image measuring device measures the distance to the object based on the flight time of the light. Such distance image measuring device is referred to as a time of flight system (ToF system) distance image measuring device.

As a device for measuring the distance by the ToF system, there has been also known a device in which a pulse laser light is used as a projected light and a reflected light is received not by an image sensor but by a single light receiving device. In a device disclosed in a related art, a reflecting member is disposed in a housing in a direction opposite to a laser light transmitting plate when viewed from a rotating mirror, and correction data used for distance calculation is generated on the ground that a path length of a light projection and reception path passing through the reflecting member has been known.

According to a distance image measuring device of the ToF system, it is possible to obtain a three-dimensional image at high speed. Therefore, the distance image measuring device of the ToF system may be used for security purposes, such as monitoring a periphery of a robot by the distance image measuring device of the ToF system and stopping the robot in an emergency when a person approaches the robot.

When the ToF system distance image measuring device is used for the security purposes, high reliability may be required. More specifically, there may be a need to sequentially confirm that the projected light is projected from the light source, and that the projected light is received by all of pixels that detect the light of a set field of view among the multiple pixels included in an image sensor. Further, there may be a need to sequentially confirm that an arithmetic device for calculating the distance can correctly calculate the distance.

In a related art, correction data is generated from the time of flight when the projected light is projected toward the reflecting member whose path length of the light projection and reception path has been known. When the correction data can be generated, it can be confirmed that the light source can emit a pulsed laser light and that the light receiving device can detect the pulsed laser light. In other words, it can be confirmed that the light projecting system and the light receiving system are normal or work properly. In addition, the distance can be correctly calculated with the use of the correction data.

It is assumed that it is examined whether the presence or absence of abnormality can be sequentially determined with the use of the technique disclosed in a related art even in the ToF system distance image measuring device used for the security purposes. As described above, when the ToF system distance image measuring device is used for the security purposes, there may be a need to sequentially confirm that the projected light is received by all the pixels that detect the light of a set field of view among multiple pixels provided in the image sensor. Therefore, if the technique of the related art is simply used, there may be a need to dispose the reflecting member that completely blocks the field of view of the image sensor. The distance of an object present outside the device cannot be measured if the entire field of view is blocked. Therefore, there may be a difficulty regarding how to sequentially check the presence or absence of an abnormality of the device.

The present disclosure describes a distance image measuring device capable of sequentially confirming the presence or absence of abnormality.

According to one aspect of the present disclosure, a distance image measuring device may be provided. The distance image measuring device may comprise: a light source that is configured to project a light; an image sensor that is configured to receive a reflected light generated by reflection of a projected light from an object, the projected light being the light projected by the light source; a housing that accommodates the light source and the image sensor; a window that is provided in the housing and through which the projected light and the reflected light pass; a distance calculation section that is configured to calculate a distance to the object based on a flight time, which is a time from projection of the projected light from the light source to reception of the reflected light by the image sensor; a reflection state switching member that is disposed on an optical path of the projected light away from the window within the housing, capable of switching between a reflection state in which the projected light is reflected in a direction toward the image sensor and a transmission state in which the projected light is transmitted, and is fixed to an inside of the device; and an abnormality determination section that is configured to determine whether there is an abnormality in a function of detecting the object existing in an observation field of view of the image sensor. A light receiving surface of the image sensor includes a visual field corresponding region; which is a region necessary for detecting the object existing in the observation field of view. The light receiving surface detects a reference internal reflected light, which is the reflected light generated by reflection of the projected light by the reflection state switching member which is in the reflection state. The abnormality determination section determines whether the distance calculated by the distance calculation section based on the reference internal reflected light received in the visual field corresponding region with the reflection state switching member being in the reflection state falls within a normal range, and determines whether there is the abnormality in the function of detecting the object existing in the observation field of view.

The distance image measuring device includes a reflection state switching member. When the reflection state switching member is in a reflection state; the projected light is reflected by the reflection state switching member, and a reference internal reflected light generated by the reflection is detected by a visual field corresponding region of a light receiving surface of the image sensor.

Since the reflection state switching member is fixed in the device, a normal range of the distance calculated by the distance calculation section can be set in advance when the reference internal reflected light generated by reflection by the reflection state switching member is detected by the visual field corresponding region of the image sensor.

The reflection state switching member is turned into the reflection state and the distance calculated by the distance calculation section based on the reference internal reflected light detected by the pixels existing in the visual field corresponding region of the image sensor in this state is compared with a preset normal range, thereby being capable of determining whether there is an abnormality in an element for detecting the object existing in the observation field of view, such as a pixel existing in the visual field corresponding region of the image sensor.

When the reflection state switching member is switched to the transmission state, the projected light is projected to the outside of the device through the reflection state switching member, and the reflected light generated outside the device is also transmitted through the reflection state switching member and received by the image sensor. It is possible to measure the distance to the object outside the device.

Further, the reflection state switching member is disposed closer to the light source and the image sensor than the window so as to be away from the window. Therefore, since the reflection state switching member can be set to be smaller than the reflection state switching member disposed in contact with the window, it is possible to reduce an increase in the cost due to the provision of the reflection state switching member.

In one aspect, the reflection state switching member may have a surface that reflects the projected light. The surface of the reflection state switching member may be inclined with respect to an optical axis of the projected light.

One mode of abnormality is fixation of a value. If the fixation of the values occurs for the multiple pixels, it is considered that the calculated distances are often the same regardless of the pixels even if the actual flight times of the reflected light detected by the multiple pixels are different from each other.

As in the above configuration, when the surface of the reflection state switching member that reflects the projected light is inclined with respect to the optical axis of the projected light, the optical path length from the light source through the reflection state switching member to the multiple pixels existing in the visual field corresponding region of the image sensor continuously change in accordance with the position of the pixels, and the flight time corresponding to the optical path length also continuously change in accordance with the position of the pixels. Therefore, the normal range corresponding to each pixel changes continuously. Since the distances calculated for the multiple pixels are often the same when the values are fixed, it is possible to easily detect the fixation of the values with the provision of the configuration described above.

In one aspect, the distance image measuring device may comprise a mirror that has a mirror surface inclined with respect to the optical axis of the projected light to reflect the projected light in a direction toward the window and to reflect the reflected light incident from the window in a direction toward the image sensor. The reflection state switching member may be disposed on the mirror surface.

With the provision of the mirror that reflects the projected light in the direction toward the window, the mirror can be used as a member that fixes the reflection state switching member on the optical path of the projected light without hindering the measurement of the distance to an object outside the device.

In one aspect, the reflection state switching member may include a transparent image display panel. The distance image measuring device may comprise a display controller that is configured to display on the transparent image display panel, a colored portion reflecting the projected light in a direction toward the image sensor. The abnormality determination section may cause the display controller to display the colored portion on the transparent image display panel so as to provide a part of the observation field of view on the transparent image display panel. The abnormality determination section may move the colored portion to determine whether a distance to the colored portion calculated by the distance calculation section falls within the normal range. The abnormality determination section may determine whether movement of the colored portion determined based on the reference internal reflected light detected by the image sensor matches movement of the colored portion caused by the display controller.

In the distance image measuring device, the colored portion for reflecting the projected light in the direction toward the image sensor is formed on the transparent image display panel so as to form a part of the observation field of view, and the colored portion is moved. When the colored portion has been moved, it should be confirmed that the colored portion has been moved from the reference internal reflected light detected by the image sensor.

Therefore, in addition to determining whether the distance to the colored portion calculated by the distance calculation section falls within the normal range, the abnormality determination section also determines whether the movement of the colored portion determined according to the reference internal reflected light detected by the image sensor coincides with the movement of the colored portion by the display controller.

With the above configuration, it is possible to reduce a situation where it cannot be determined that the distance image measuring device is abnormal even though the distance image measuring device is abnormal.

First Embodiment

Embodiments will be described with reference to the drawings. FIG. 1 is a diagram showing a configuration of a distance image measuring device 1 according to the present embodiment. The distance image measuring device 1 includes a housing 10, and a light projecting and receiving portion 20, a deflection portion 30, and a controller 40 are accommodated in the housing 10.

The housing 10 is made of a light shielding material. An opening 11 is provided in a part of the housing 10. A window 12 is attached to the opening 11. The window 12 has a light transmission property that allows projected lights Lp projected by light sources 21 and reflected lights Lr generated by the reflection of the projected lights Lp by an object to pass through the window 12.

The light projecting and receiving portion 20 includes the light sources 21 and an image sensor 22. The light sources 21 and the image sensor 22 are fixed to the same substrate 23. Since the distance image measuring device 1 measures a distance to the object by the ToF system, the light sources 21 project the projected lights Lp, which are lights for irradiating the object. Lights of various wavelengths may be used as the projected lights Lp. For example, the projected lights Lp are infrared lights such as 940 nm. The projected lights Lp may be infrared lights having a length of 0.7 μm to 1000 μm. The light sources 21 may project the projected lights Lp in a pulse shape. The light sources 21 are, for example, LEDs (light-emitting diodes). In FIG. 1, two light sources 21 are provided across the image sensor 22. The number of the light sources 21 may be one, or three or more. The light sources 21 and the image sensor 22 may be fixed to different substrate.

The image sensor 22 may be formed of an image sensor such as a CMOS image sensor, a CCD image sensor, or the like, which is used when measuring the distance by the ToF system. The image sensor 22 includes multiple pixels, and in which direction each pixel receives the reflected light Lr can be determined at the time of design. An angle at which the image sensor 22 detects the reflected light Lr is an angle of view, and the field of view can be defined by the angle of view in a horizontal direction and the angle of view in a vertical direction. The light sources 21 can project the projected light Lp over the entire range of the field of view. Although not shown in FIG. 1, a lens for diffusing the projected light Lp and a lens for condensing the reflected light Lr may be provided.

The observation field of view is a field of view that can be detected by the image sensor 22 and is actually used for detection of the object. The observation field of view may be the entire field of view that can be detected by the image sensor 22, or may be a part of the field of view. The observed range becomes wider as the distance from the light projecting and receiving portion 20 increases.

The deflection portion 30 includes a mirror 31, a support post 32, and a liquid crystal panel 33. The mirror 31 has a plane mirror surface, Even if the mirror surface is a concave surface, the mirror surface reflects the projected light Lp in a direction toward the window 12, and reflects the reflected light Lr in a direction of the image sensor 22. In order to reflect the projected light Lp and the reflected light Lr in this manner, the mirror surface of the mirror 31 is inclined with respect to an optical axis of the projected light Lp. The inclined state means that an angle formed by the mirror surface and the optical axis of the projected light Lp is not 90 degrees.

The support post 32 connects the mirror 31 and the housing 10. The support post 32 fixes the mirror 31 to the housing 10. In the present embodiment, the liquid crystal panel 33 is disposed on the mirror surface of the mirror 31. The structure of the liquid crystal panel 33 is a structure in which a filter, a liquid crystal layer, and a transparent electrode are sandwiched between a pair of light transmission layers, and transmits the projected light Lp and the reflected light Lr. The light transmission layer is formed of, for example, a glass plate. The liquid crystal panel 33 as a whole is a transparent image display panel that transmits the projected light Lp and the reflected light Lr. A thickness of the liquid crystal panel 33 is not particularly limited, and may be as thick as often referred to as a film or more.

The liquid crystal panel 33 is connected to the controller 40. A part or all of the liquid crystal panel 33 is colored by being controlled by the controller 40. The liquid crystal panel 33 is of a reflection type. The colored portion diffusely reflects the projected light Lp and the reflected light Lr. A part of the reflected light Lr generated by diffuse reflection of the projected light Lp is directed toward the image sensor 22. Therefore, in the colored state, the liquid crystal panel 33 reflects the projected light Lp toward the image sensor 22, A state in which at least a part of the liquid crystal panel 33 is colored is also referred to as a reflection state. On the other hand, a state in which the liquid crystal panel 33 is not colored and transmits the projected light Lp and the reflected light Lr may be referred to as a transmission state. The liquid crystal panel 33 can switch between the reflection state and the transmission state by being controlled by the controller 40, and functions as a reflection state switching member.

A size of the liquid crystal panel 33 is a size capable of coloring all of the observation field of view. As described above, the observed range increases as the distance from the light projecting and receiving portion 20 increases, but at the position of the mirror 31, the observed range is smaller than the mirror 31, In other words, the size of the mirror 31 is larger than the observation range at an installation position of the mirror 31. As shown in FIG. 1, if the liquid crystal panel 33 has the same size as that of the mirror 31, the liquid crystal panel 33 is also larger than the observation range.

Figure 2:
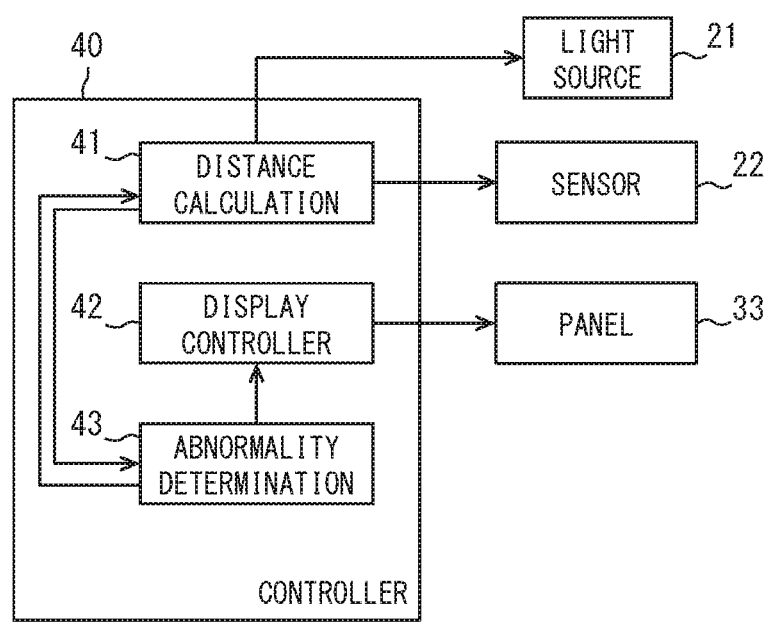
FIG. 2 is a diagram showing a controller.

The controller 40 controls the light projecting and receiving portion 20 and the liquid crystal panel 33, The controller 40 can be realized by, for example, a computer including a CPU, a ROM, a RAM, an I/O, a bus line connecting those components, and the like. The ROM stores a program for causing the computer to function as the controller 40. The computer may be a general-purpose computer, and may be a special purpose computer such as ASIC, and may be a combination of them. When the CPU executes the program stored in the ROM while utilizing a temporary storage function of the RAM, the controller 40 executes the functions of a distance calculation section 41, a display controller 42, and an abnormality determination section 43, as shown in FIG. 2.

The distance calculation section 41 sequentially calculates a distance to an object outside the device and within the observation field of view. Then, the distance calculation section 41 sequentially generates three-dimensional distance images indicating the above distance by images. More specifically, the distance calculation section 41 periodically projects the projected lights Lp from the light sources 21, and determines a time point at which the pixel existing in the visual field corresponding region among the pixels of the image sensor 22 receives the reflected light Lr. As described above, the direction in which each pixel receives the reflected light Lr can be determined at the time of design. Therefore, if the observation field of view is determined, it can be determined in advance in which region of the light receiving surface of the image sensor 22 the reflected light Lr received by the image sensor 22 is received within the observation field of view. On the light receiving surface of the image sensor 22, a region that receives the reflected light Lr from each direction in the observation field of view is a visual field corresponding region.

A time from when the light sources 21 project the projected lights Lp to when each pixel existing in the visual field corresponding region receives the reflected light Lr is a flight time. A distance to the object from which the reflected light Lr is reflected is calculated by multiplying the flight time by the speed of light. An image representing the result of calculating the distance for each pixel existing in the visual field corresponding region is a three-dimensional distance image.

After creating the three-dimensional distance image, the distance calculation section 41 may sequentially determine distances between multiple objects in the three-dimensional distance image. The distance calculation section 41 determines a situation in which a person and a robot are too close to each other, or the like based on the distance to the object indicated by the three-dimensional distance image or the distances between the objects, and outputs a warning when a predetermined warning condition is satisfied.

Since the distance image measuring device 1 according to the present embodiment is used for such a security application, the abnormality determination section 43 periodically checks the presence or absence of an abnormality of the device by itself. The abnormality determination section 43 determines that there is no abnormality in the case where the distance can be measured correctly in the whole region of the observation field of view. The abnormality determination section 43 determines that the device is abnormal in the case where there is a portion in which the reflected light Lr cannot be detected even in a part of the observation field of view, or in the case where the reflected light Lr can be detected but the distance cannot be calculated correctly.

Figure 3:
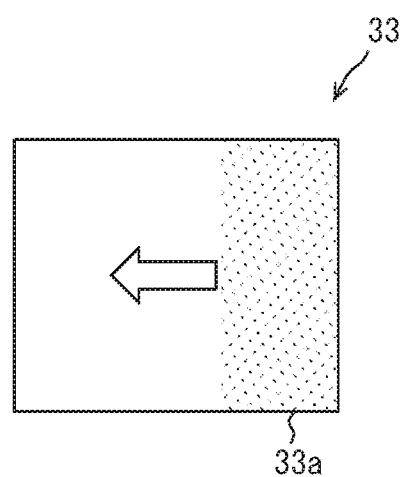
FIG. 3 is a diagram illustrating a liquid crystal panel a part of which is a colored portion.

When the abnormality determination section 43 performs the abnormality determination, the display controller 42 sets the liquid crystal panel 33 to the reflection state. More specifically, in the present embodiment, as shown in FIG. 3, the display controller 42 sets a part of the liquid crystal panel 33 as a colored portion 33a, The colored portion 33a has a size that becomes a part of the observation field of view. FIG. 3 is a diagram viewed from a direction orthogonal to the surface of the liquid crystal panel 33. In FIG. 3, the colored portion 33a has a rectangular shape. Long sides of the rectangular shape have the same length as one side of the liquid crystal panel 33. The display controller 42 moves the colored portion 33a in a direction indicated by an arrow shown in FIG. 3 until the colored portion 33a comes into contact with the other side opposite to the side before the start of movement.

The abnormality determination section 43 instructs the display controller 42 to set the liquid crystal panel 33 in the reflection state in order to periodically check whether there is an abnormality in the device. Since the liquid crystal panel 33 is fixed to the mirror 31, the optical path length in the case where the projected light Lp is reflected by the colored portion 33a of the liquid crystal panel 33 and received by each pixel existing in the visual field corresponding region of the image sensor 22 can be calculated in advance. Therefore, the flight time of the reflected light Lr reflected by the colored portion 33a of the liquid crystal panel 33 and received by each pixel existing in the visual field corresponding region of the image sensor 22 and the normal range of the distance that can be calculated from the flight time can be set in advance.

Therefore, the abnormality determination section 43 actually projects the projected lights Lp from the light sources 21, and calculates the distance based on the reflected light Lr reflected by the colored portion 33a of the liquid crystal panel 33 and received by each pixel existing in the visual field corresponding region of the image sensor 22. Then, the abnormality determination section 43 checks whether the calculated distance falls within the normal range, thereby being capable of checking whether there is an abnormality in the distance image measuring device 1.

As described above, the reflected light Lr generated by reflection at the colored portion 33a of the liquid crystal panel 33 is the reflected light Lr capable of checking whether there is an abnormality in the distance image measuring device 1. The reflected light Lr is hereinafter referred to as a reference internal reflected light.

Figure 4:
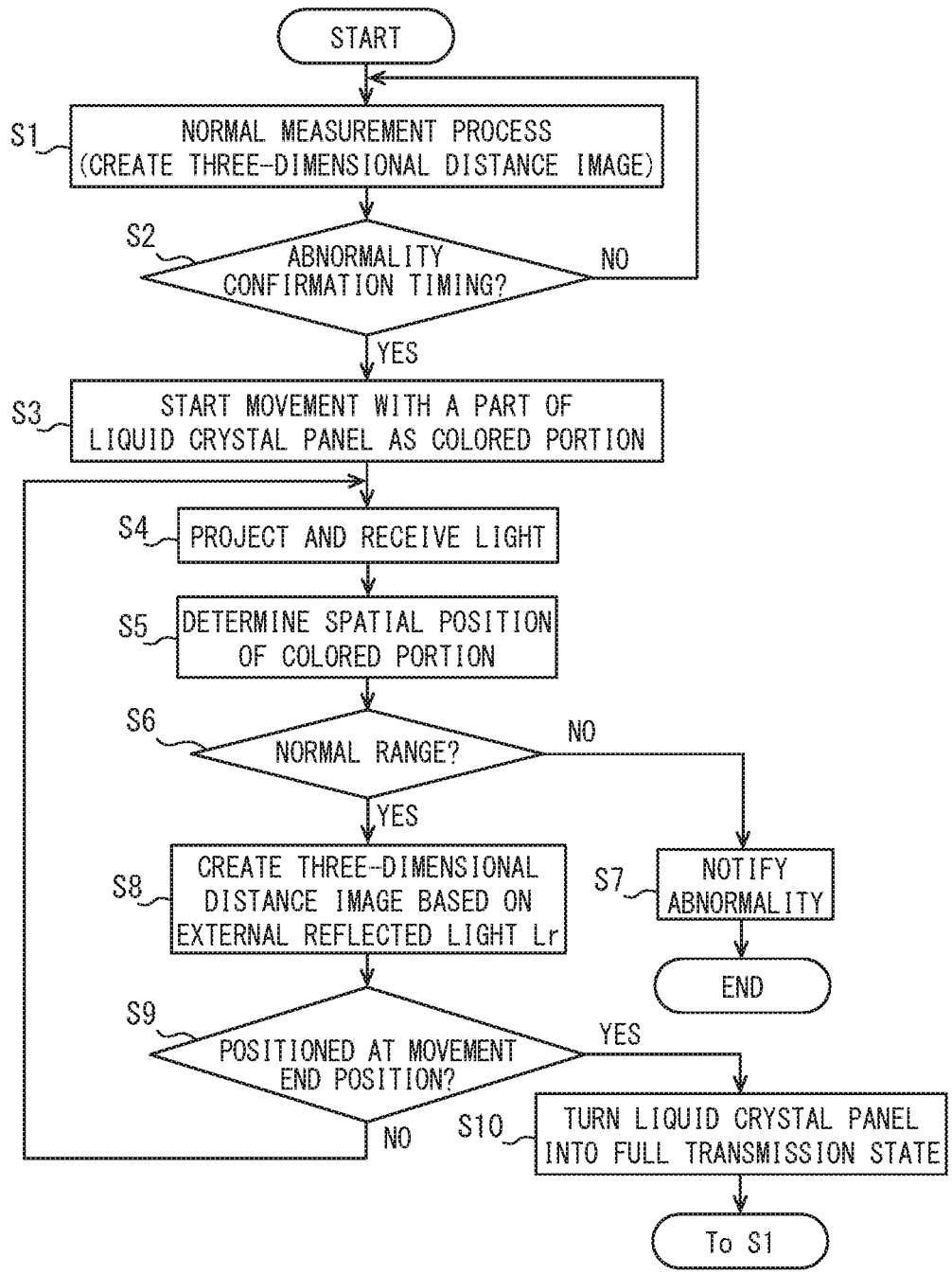
FIG. 4 is a flowchart showing processing to be executed by the controller.

The processing to be executed by the controller 40 will be further described with reference to FIG. 4. In FIGS. 4, S1, S4, S5, and S8 are executed by the distance calculation section 41. S2, S6, and S7 are executed by the abnormality determination section 43. S3, S9, and S10 are executed by the display controller 42.

In S1, a normal measurement process is executed. The normal measurement process is a process in which the projected light Lp is projected with the entire surface of the liquid crystal panel 33 being in the transmission state, and a three-dimensional distance image is generated based on the reflected light Lr detected by all the pixels existing in the visual field corresponding region of the image sensor 22. Further, in the normal measurement process, it is determined whether a warning condition is satisfied based on the created three-dimensional distance image. When the warning condition is satisfied, a warning is output.

In S2, it is determined whether an abnormality confirmation timing has come. The abnormality confirmation timing is set in advance, and can be set to a predetermined cycle. If the determination result in S2 is NO, the process returns to S1. The normal measurement process is continued. On the other hand, when the determination result of S2 is YES, the process proceeds to S3.

In S3, a part of the liquid crystal panel 33 is set as the colored portion 33a. The movement of the colored portion 33a at a constant speed is started. This state is a state shown in FIG. 3. The constant speed is a speed at which a gap does not occur between a spatial position of the colored portion 33a determined in S5 and a spatial position of the colored portion 33a determined by next executing S5. In S4, the projected lights Lp are projected from the light sources 21, and the reflected light Lr is received by the image sensor 22.

In S5, the distance of the colored portion 33a is calculated based on the flight time that can be calculated by executing S4. The colored portion 33a moves at the constant speed after S3 has been executed. Therefore, the position of the colored portion 33a can be calculated based on an elapsed time from the start of the movement. When the position of the colored portion 33a can be calculated, the pixel that receives the reference internal reflected light from the colored portion 33a can be identified. In S5, the distance of the colored portion 33a is calculated based on the reflected light Lr detected by the pixel identified in the above manner. The distance is also calculated based on the signal output from the pixels surrounding the pixels which receive the reference internal reflected light from the colored portion 33a and which originally correspond to the portion of the liquid crystal panel 33 in the transmission state. This is to determine whether the position and size of the colored portion 33a can be observed at the correct position and size.

After the distance has been calculated on the basis of the signals output from the pixels corresponding to the colored portion 33a and the pixels around the colored portion 33a, a portion where the distance is not a distance outside the device is determined. A range formed by a portion other than the distance outside the device is defined as a spatial position of the colored portion 33a.

In S6, it is determined whether the spatial position of the colored portion 33a determined in S5 falls within a normal range that can be determined with reference to the position of the colored portion 33a generated on the liquid crystal panel 33 by the display controller 42. The normal range is a range in which an allowable error is added with reference to the position of the colored portion 33a generated on the liquid crystal panel 33 by the display controller 42. The spatial position of the colored portion 33a is defined by the distance and orientation to the colored portion 33a, and the shape and size of the colored portion 33a. Therefore, with the determination of whether the spatial position of the colored portion 33a is within the normal range, it is also determined whether the calculated distance of the colored portion 33a is within the normal range. When the spatial position of the colored portion 33a determined in S5 is not within the normal range, the distance image measuring device 1 is not normal, and has some abnormality. Then, the process proceeds to S7, and an abnormality notification is performed.

On the other hand, when it is determined in S6 that the spatial position of the colored portion 33a determined in S5 is within the normal range, the process proceeds to S8. In S8, a three-dimensional distance image is generated from the reflected light Lr outside the device detected in the light projection and reception in S4. After the three-dimensional distance image is created, it is determined whether the warning condition is satisfied in the same manner as in S1.

In S9, it is determined whether the colored portion 33a has reached a position where the movement is finished. If the determination result is NO, the process returns to S4. Since it is determined whether the spatial position of the colored portion 33a determined based on the projection and reception light is within the normal range until the colored portion 33a reaches the movement end position, it can be determined whether the internal reference reflected light can be correctly received for all the pixels in the visual field corresponding region.

If the determination result in S9 is YES, it can be confirmed that there is no abnormality in the entire device, including the state that all the pixels in the visual field corresponding region are able to correctly receive the internal reference reflected light. Then, the process proceeds to S10, and the liquid crystal panel 33 is brought into a full transmission state. Thereafter, the process returns to S1.

The distance image measuring device 1 according to the first embodiment described above includes the liquid crystal panel 33, When a part of the liquid crystal panel 33 is the colored portion 33a, the reference internal reflected light generated by the reflection of the projected light Lp by the colored portion 33a is detected by the visual field corresponding region of the light receiving surface of the image sensor 22. The normal range of the distance calculated when the reference internal reflected light is detected by the visual field corresponding region of the image sensor 22 is set in advance.

The liquid crystal panel 33 is put in a colored state, and the distance calculated by the distance calculation section 41 based on the reference internal reflected light detected by the pixels existing in the visual field corresponding region of the image sensor 22 in the colored state is compared with a normal range set in advance (S6). In the distance image measuring device 1, the distance image measuring device 1 can determine whether there is an abnormality in an element for detecting an object present in the observation field of view, such as a pixel present in the visual field corresponding region of the image sensor 22.

When the liquid crystal panel 33 is switched to the full transmission state (S10), the projected light Lp is transmitted through the liquid crystal panel 33, reflected by the mirror 31, and projected to the outside of the device. The reflected light Lr generated outside the device also passes through the liquid crystal panel 33, is reflected by the mirror 31, and is received by the image sensor 22. According to this configuration, it is possible to measure the distance to an object outside the device over the entire range of the observation field of view.

Further, the liquid crystal panel 33 is put on the mirror surface of the mirror 31. Therefore, the liquid crystal panel 33 is disposed closer to the light sources 21 and the image sensor 22 than the window 12 so as to be far from the window 12. In other words, the liquid crystal panel 33 is disposed on the optical path of the projected light Lp away from the window 12. As a result, the size of the liquid crystal panel 33 can be reduced as compared with the case where the liquid crystal panel 33 is disposed in contact with the window 12, and it is possible to reduce an increase in the cost due to the provision of the liquid crystal panel 33.

In the present embodiment, the liquid crystal panel 33 is disposed so as to be inclined with respect to the optical axis of the projected light Lp. When the liquid crystal panel 33 is inclined with respect to the optical axis of the projected light Lp in this manner, when a position in the colored portion 33a is changed along an inclination direction, the distance to the position is continuously changed. On the other hand, when the fixation of a value occurs, the distances calculated for the multiple pixels are often the same, and therefore, according to the present embodiment, it is easy to detect that the fixation of the value occurs.

In the present embodiment, the mirror 31 is provided. The mirror 31 can be used as a member for fixing the liquid crystal panel 33 on the optical path of the projected light Lp without hindering the measurement of the distance to the object outside the device. Since the mirror 31 is inclined with respect to the optical axis of the projected light Lp, it is possible to dispose the liquid crystal panel 33 to be inclined with respect to the optical axis of the projected light Lp by placement of the liquid crystal panel 33 on the mirror 31.

In the present embodiment, the colored portion 33a having the size to be the whole observation field of view is not formed on the liquid crystal panel 33 at once, but the colored portion 33a is formed on the liquid crystal panel 33 so as to be a part of the observation field of view, and the colored portion 33a is moved (S3). Then, in the process of moving the colored portion 33a, the spatial position of the colored portion 33a is sequentially determined to determine whether the spatial position of the colored portion 33a falls within the normal range (S6). In other words, in the present embodiment, in addition to determining whether the distance to the colored portion 33a falls within the normal range, it is also determined whether the movement of the colored portion 33a determined based on the reference internal reflected light detected by the image sensor 22 matches the movement of the colored portion 33a by the display controller 42. This makes it possible to reduce the number of cases where it cannot be determined that the distance image measuring device 1 is abnormal, even though the distance image measuring device 1 is abnormal.

Even while the colored portion 33a is being moved, the reflected light Lr outside the device can be received, and a three-dimensional distance image is created from the reflected light Lr. This makes it possible to eliminate a case in which the object outside the device cannot be detected in the entire observation field of view.

Second Embodiment

A second embodiment will be described. In the following description of the second embodiment, elements having the same reference numerals as those used so far are the same as the elements having the same reference numerals in the previous embodiment, except when specifically mentioned. When only a part of the configuration is described, the embodiment described above can be applied to other parts of the configuration.

Figure 5:
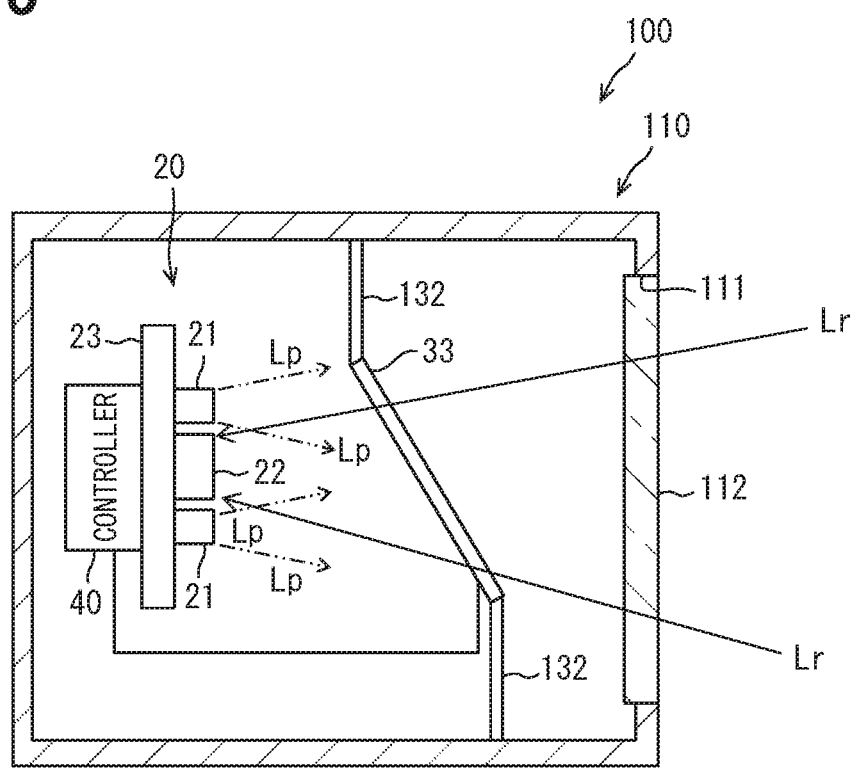
FIG. 5 is a diagram showing a configuration of a distance image measuring device according to a second embodiment.

FIG. 5 shows a configuration of a distance image measuring device 100 according to the second embodiment. In the distance image measuring device 100, the same light projecting and receiving portion 20 as in the first embodiment is accommodated in a housing 110. In the first embodiment, the light sources 21 and the image sensor 22 included in the light projecting and receiving portion 20 do not face the window 12. In the second embodiment, light sources 21 and an image sensor 22 face a window 112. The window 112 is the same light transmission property as that of the window 12 of the first embodiment, and is attached to an opening 111.

The distance image measuring device 100 does not include a mirror 31. Therefore, in the distance image measuring device 100, a projected light Lp projected by a light sources 21 is projected to the outside of the device without being deflected, and a reflected light Lr incident from the outside of the device is incident on the image sensor 22 without being deflected.

Since the mirror 31 is not provided, in the distance image measuring device 100, the liquid crystal panel 33 is directly supported to a housing 110 by a support post 132. In this manner, even if the mirror 31 is not provided and the liquid crystal panel 33 is disposed between the light projecting and receiving portion 20 and the window 112, the controller 40 can execute the same processing as that of the first embodiment to successively confirm the presence or absence of abnormality in the distance image measuring device 100.

Although the embodiments have been described above, the disclosed technology is not limited to the above-described embodiments, and the following modifications are included in the disclosed range, and various modifications can be made without departing from the spirit except as described below.

(Modification 1)

In the embodiment, the liquid crystal panel 33 is provided as the reflection state switching member, and while a part of the liquid crystal panel 33 is set as the colored portion 33a and the colored portion 33a is moved, it is determined whether a spatial position of the colored portion 33a falls within a normal range. The colored portion 33a having a size that becomes the entire observation field of view may be formed on the liquid crystal panel 33. It may be determined at one time whether all the pixels in the visual field corresponding region of the image sensor 22 can normally receive the reference internal reflected light.

(Modification 2)

In the case where the colored portion 33a having a size to be the entire observation field of view is formed and the colored portion 33a is not moved, a member for switchingly bringing an entire dimming glass or the like in a reflection state by being colored or the entire dimming glass in a transmission state may be used as the reflection state switching member instead of the liquid crystal panel 33. As a dimming system of the dimming glass, various systems, for example, an electrochromic system and a gas chromic system can be used. As the reflection state switching member capable of partially forming the colored portion, an organic EL panel can be used instead of the liquid crystal panel 33.

It is noted that a flowchart or the processing of the flowchart in the present application includes multiple steps (also referred to as sections), each of which is represented, for instance, as S1. Further, each step can be divided into several sub-steps while several steps can be combined into a single step.

The embodiment, configuration, and aspect of a distance image measuring device according to the present disclosure have been exemplified above, but the embodiment, configuration, and aspect according to the present disclosure are not limited to the above-described embodiments, configurations, and aspects. For example, embodiments, configurations, and aspects obtained by appropriately combining technical parts disclosed in different embodiments, configurations, and aspects are also included in the scope of the embodiments, configurations, and aspects according to the present disclosure.

The controllers and methods described in the present disclosure may be implemented by a special purpose computer created by configuring a memory and a processor programmed to execute one or more particular functions embodied in computer programs. Alternatively, the controllers and methods described in the present disclosure may be implemented by a special purpose computer created by configuring a processor provided by one or more special purpose hardware logic circuits. Alternatively, the controllers and methods described in the present disclosure may be implemented by one or more special purpose computers created by configuring a combination of a memory and a processor programmed to execute one or more particular functions and a processor provided by one or more hardware logic circuits. The computer programs may be stored, as instructions being executed by a computer, in a tangible non-transitory computer-readable medium.

What is claimed is:

1. A distance image measuring device comprising:
a light source that is configured to project a light;
an image sensor that is configured to receive a reflected light generated by reflection of a projected light from an object, the projected light being the light projected by the light source;
a housing that accommodates the light source and the image sensor;
a window that is provided in the housing and through which the projected light and the reflected light pass;
a distance calculation section that is configured to calculate a distance to the object based on a flight time, which is a time from projection of the projected light from the light source to reception of the reflected light by the image sensor;
a reflection state switching member that is disposed on an optical path of the projected light away from the window within the housing, capable of switching between a reflection state in which the projected light is reflected in a direction toward the image sensor and a transmission state in which the projected light is transmitted, and is fixed to an inside of the device; and
an abnormality determination section that is configured to determine whether there is an abnormality in a function of detecting the object existing in an observation field of view of the image sensor,
wherein:
a light receiving surface of the image sensor includes a visual field corresponding region, which is a region necessary for detecting the object existing in the observation field of view;
the light receiving surface detects a reference internal reflected light, which is the reflected light generated by reflection of the projected light by the reflection state switching member which is in the reflection state;
the abnormality determination section determines whether the distance calculated by the distance calculation section based on the reference internal reflected light received in the visual field corresponding region with the reflection state switching member being in the reflection state falls within a normal range, and determines whether there is the abnormality in the function of detecting the object existing in the observation field of view.

2. The distance image measuring device according to claim 1, wherein:
the reflection state switching member has a surface that reflects the projected light; and
the surface of the reflection state switching member is inclined with respect to an optical axis of the projected light.

3. The distance image measuring device according to claim 2, further comprising:
a mirror that has a mirror surface inclined with respect to the optical axis of the projected light to reflect the projected light in a direction toward the window and to reflect the reflected light incident from the window in a direction toward the image sensor,
wherein
the reflection state switching member is disposed on the mirror surface.

4. The distance image measuring device according to claim 1, wherein:

the reflection state switching member includes a transparent image display panel;
the distance image measuring device further comprises a display controller that is configured to display on the transparent image display panel, a colored portion reflecting the projected light in a direction toward the image sensor; and
the abnormality determination section causes the display controller to display the colored portion on the transparent image display panel so as to provide a part of the observation field of view on the transparent image display panel;
the abnormality determination section moves the colored portion to determine whether a distance to the colored portion calculated by the distance calculation section falls within the normal range; and
the abnormality determination section determines whether movement of the colored portion determined based on the reference internal reflected light detected by the image sensor matches movement of the colored portion caused by the display controller.

5. The distance image measuring device according to claim 1, wherein:
the abnormality determination section determines that there is no abnormality in a case where the distance calculated by the distance calculation section based on the reference internal reflected light falls within the normal range;
the abnormality determination section determines that the distance image measuring device is abnormal in at least one of a case where there is a portion in which the reflected light is not detected in the observation field of view, or a case where the distance calculated by the distance calculation section based on the reference internal reflected light is outside the normal range.

6. The distance image measuring device according to claim 5, wherein:
the normal range is a predetermined value.

7. A distance image measuring device comprising:
a light source;
an image sensor that is configured to receive a reflected light generated by reflection of a projected light from an object, the projected light being a light projected by the light source;
a housing that accommodates the light source and the image sensor;
a window that is provided in the housing and through which the projected light and the reflected light pass;
a processor that is configured to calculate a distance to the object based on a flight time, which is a time from projection of the projected light from the light source to reception of the reflected light by the image sensor; and
a reflection state switching member that is configured to switch between a reflection state and a transmission state, the reflection state in which the projected light is reflected in a direction toward the image sensor, the transmission state in which the projected light is transmitted,
wherein:
the image sensor has a light receiving surface that detects the object existing in an observation field of view of the image sensor;
the light receiving surface detects a reference internal reflected light, which is the reflected light generated by reflection of the projected light by the reflection state switching member which is in the reflection state; and the processor determines whether the distance calculated by the processor based on the reference internal reflected light falls within a predetermined range, and determines whether the distance image measuring device correctly detects the object existing in the observation field of view.

\* \* \* \* \*